(12) United States Patent
Maienschein et al.

(10) Patent No.: US 7,296,667 B2
(45) Date of Patent: Nov. 20, 2007

(54) TORQUE CONVERTER WITH A ROTARY OSCILLATION DAMPER

(75) Inventors: Stephan Maienschein, Baden-Baden (DE); Rudolf Hönemann, Ottersweier (DE)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 212 days.

(21) Appl. No.: 11/075,336

(22) Filed: Mar. 7, 2005

(65) Prior Publication Data
US 2005/0199460 A1    Sep. 15, 2005

(30) Foreign Application Priority Data
Mar. 11, 2004   (DE) .................. 10 2004 012 320

(51) Int. Cl.
*F16H 41/24*   (2006.01)
(52) U.S. Cl. .................. 192/3.3; 192/70.17; 192/212; 60/338
(58) Field of Classification Search ............... 192/204, 192/207, 212; 60/338; 464/68.1, 68.6
See application file for complete search history.

(56) References Cited

U.S. PATENT DOCUMENTS

| 5,398,562 | A | * | 3/1995 | Muchmore | ..................... 74/6 |
| 5,964,329 | A | * | 10/1999 | Kawaguchi et al. | ......... 192/3.3 |
| 6,390,263 | B1 | * | 5/2002 | Arhab | ....................... 192/3.29 |
| 7,077,253 | B2 | * | 7/2006 | Maienschein | ............... 192/3.3 |
| 2001/0007383 | A1 | * | 7/2001 | Schmid | ..................... 267/286 |
| 2003/0089567 | A1 | * | 5/2003 | Bauer et al. | ................ 192/3.29 |

FOREIGN PATENT DOCUMENTS

JP          07035195 A   *  2/1995

* cited by examiner

*Primary Examiner*—Richard M Lorence
(74) *Attorney, Agent, or Firm*—Darby & Darby

(57) ABSTRACT

A torque converter with a rotary oscillation damper has two or more rotary damper components that are rotatable in relation to each other. A friction-reducing component is arranged between the rotary damper components.

12 Claims, 6 Drawing Sheets

TORQUE CONVERTER WITH A ROTARY OSCILLATION DAMPER

BACKGROUND OF THE INVENTION

The present invention relates to a torque converter with a rotary oscillation damper, in particular for a motor vehicle.

The state of the art includes torque converters in a multitude of configurations in which rotary oscillation dampers (hereinafter referred to as dampers, for short) are an integral part. In the torque-transfer connection from a combustion engine to the input shaft of a transmission, the torque is transmitted through at least one input part of the damper by way of springs to an output part. In order to retain the springs securely in place at all times, the at least one input part and the output part are arranged intimately adjacent to each other, and as a result there is a considerable amount of friction between these parts.

In order to achieve favorable damping properties in a torque-converter damper, the hysteresis should be as small as possible and, most of all, it should be uniform.

In the common understanding, the term hysteresis means a deviation of the characteristic curve that represents torque as a function of the angle of rotation where, as a result of friction, the characteristic curve does not pass through the origin of the torque/angle coordinate system. In other words, due to frictional forces or torques, the torque/angle graph (under the assumption of a constant frictional force or torque) for one sense of rotation is shifted upwards, parallel to a "hypothetical torque/angle characteristic" passing through the origin, while for the opposite sense of rotation, the torque/angle graph is shifted downwards. As a result, there is a discontinuous jump in the torque at the reversal of the sense of rotation. As a further drawback, the torque/angle characteristic lacks a reversible, linear behavior around the zero point.

As a further negative factor, the hysteresis (even in cases where it is small) is difficult to control over the angular range of the damper and in its behavior over long periods of time.

OBJECT OF THE INVENTION

Notwithstanding the multitude of damper principles already available under the present state of the art and their relatively favorable damping properties, the present invention pursues the task of providing further improvements in the damping properties of a rotary oscillation damper.

SUMMARY OF THE INVENTION

According to the invention, a solution to this task is offered through a concept where the friction in specific places in the damper is lowered by means of an appropriately configured component.

By this measure, the damping properties are improved in a way that was never expected before. The solution according to the invention leads to noticeable improvements of the damping behavior of so-called turbine dampers as well as purely torsional dampers particularly in torque converters. In the case of a turbine damper, the torque—and with it the rotary damping action—are transmitted through the damper even if the converter bypass clutch is disengaged. The term "purely torsional damper" in the field of automotive technology relates to a damper which is active only when the converter bypass clutch is in the engaged condition.

BRIEF DESCRIPTION OF THE DRAWINGS

A detailed explanation of the invention will be presented below with references to the drawings, wherein.

DETAILED DESCRIPTION OF PREFERRED EMBODIMENTS

Figure 1:
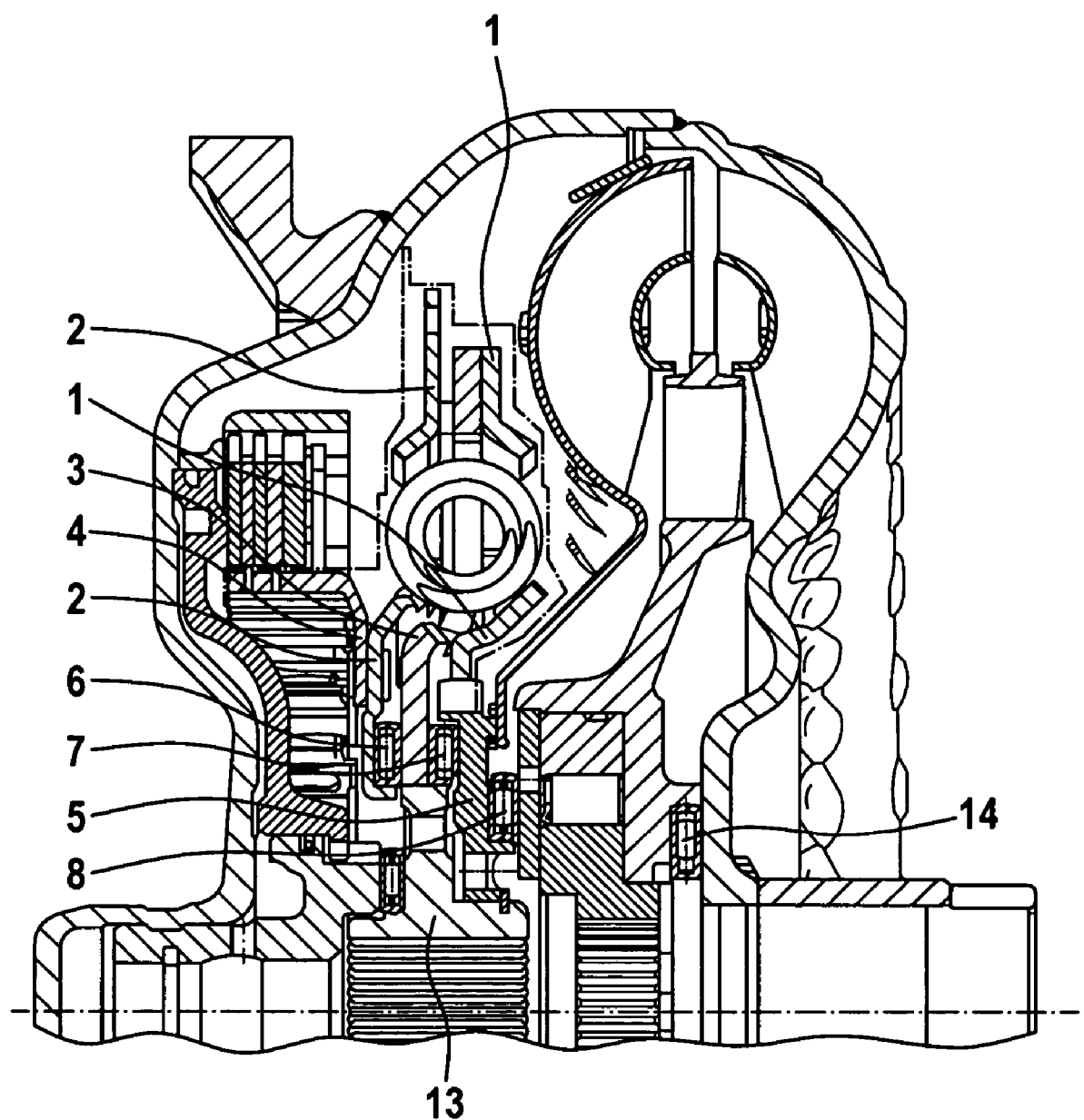
FIG. 1 represents a sectional view of a torque converter with two axial needle bearings in the area of the damper.

FIG. 1 illustrates how the springs of the damper are embraced by a right-hand input part 1, a left-hand input part 2 and an output part 3. The radially inner portion of the output part 3 is configured as a flange and rotationally tied to a damper hub 13. The damper hub 13 passes the damped torque on to the transmission input shaft (not shown in the drawing). An inner disk carrier 4 of the converter bypass clutch is rotationally tied to the left-hand input part 2. The turbine of the torque converter is rotationally tied to a turbine hub 5. The turbine hub 5 is supported on an outer circumference of the damper hub 13. The fight-hand input part 1 is rotationally tied to the turbine hub 5 through meshing tooth profiles which permit axial movement. Interposed between the turbine hub 5 and the stator wheel (shown here without reference number) is a bearing 8 which is in this case configured as an axial needle bearing. Because the stator wheel and the torque converter housing are likewise rotatable relative to each other, there is also a bearing 14—preferably a needle bearing—arranged between them.

In the operation of the torque converter, the turbine is subjected to an axial thrust which, in turn, can cause further reactive forces acting against the output part 3 and the left-hand input part 2. This axial thrust becomes stronger the larger the power that is transmitted through the torque converter. The inventors discovered that especially this part of the damper—more specifically the aforementioned reactive forces—are the source for the unfavorable (i.e., large) hysteresis. In the case of the embodiment of FIG. 1, the solution was found in the inventive concept of arranging bearings 6, 7, respectively, between the left-hand input part 2 and the output part 3 as well as between the output part 3 and the turbine hub 5. The bearings 6, 7 in this embodiment are configured as needle bearings. They have the effect that the friction between the components that rotate relative to each other is strongly reduced, with the result that the torque/angle characteristic essentially no longer has a hysteresis.

Figure 2:
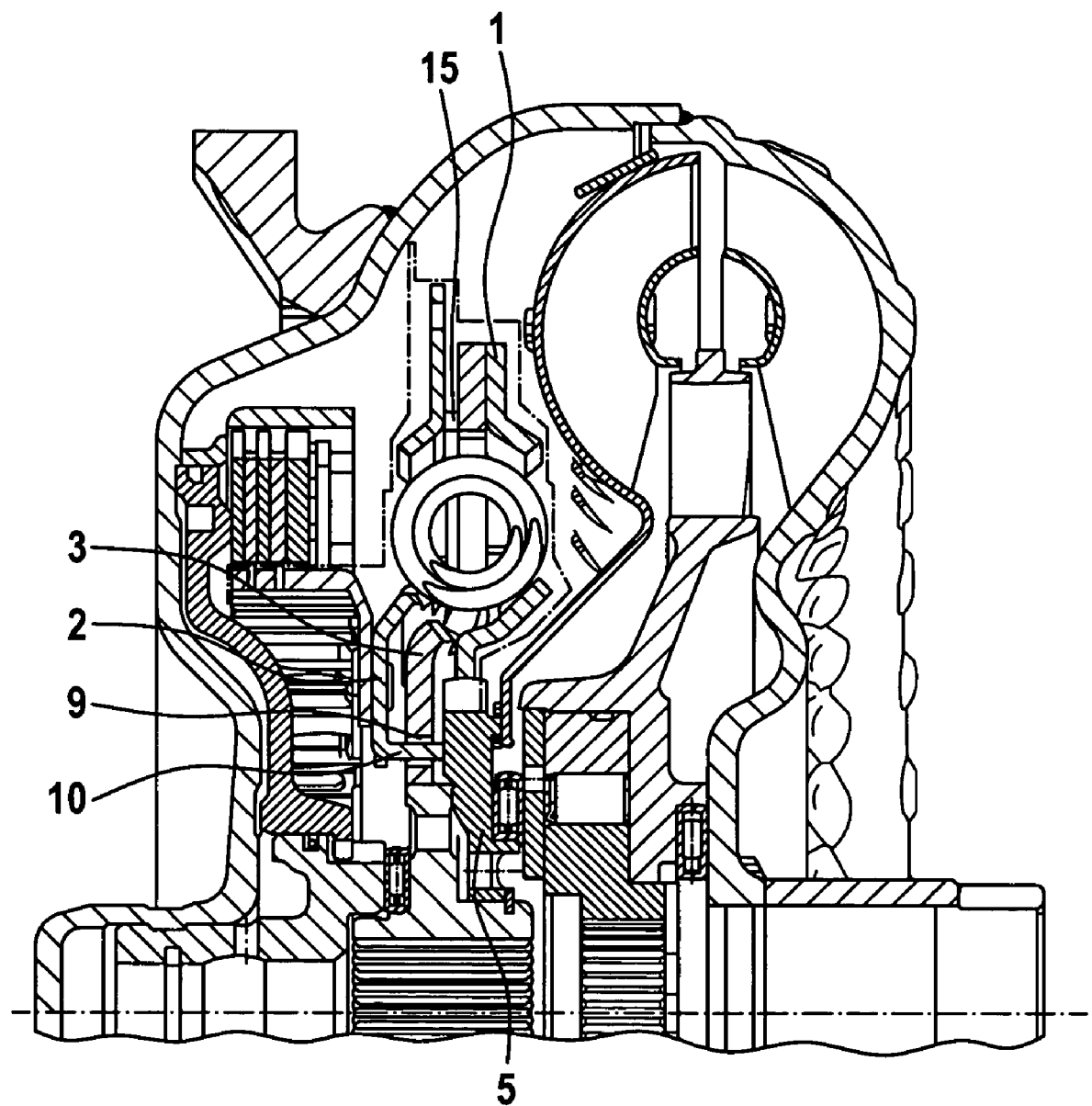
FIG. 2 represents a sectional view of a torque converter, wherein the left-hand input part of the damper bears axially against a synchronously rotating component.

FIG. 2 illustrates a different measure by which the hysteresis of the damper was improved, i.e., reduced. In an advantageously developed embodiment of the invention, a tongue 10, i.e., an angled-out extension of the left-hand input part 2, reaches through a clearance opening 9 in the output part 3 (specifically the flange portion of output part 3) and bears against the turbine hub 5. The tongue in this arrangement can also be used as an angle-delimiting element for the range of rotation. As the turbine hub 5 and the left-hand input part 2 are rotating synchronously (the right-hand input part 1 is rotationally tied to the turbine hub 5 through meshing tooth profiles, and part 1 is rotationally tied to part 2), no frictional forces will occur between the components 5 and 10. This configuration of the damper is advantageous for the reason that no additional bearings 6, 7 are required. By keeping the left-hand input part 2 spaced apart from the output part 3 as well as keeping the right-hand output part 1 spaced apart from the output part 3, the friction is noticeably reduced and the damper hysteresis is improved as a result. The fact that the input parts 1 and 2 have to rotate together is also clear from the fact that they are coupled to each other by a riveted connection 15. The riveted connection can be advantageously realized with a stepped-off tongue.

In a variation that is not illustrated in the drawing, the right-hand input part 1 can extend farther inward in the radial direction, so that the tongue 10 bears against the part 1 (the tooth-profiled coupling between the right-hand input part 1 and the turbine hub 5 is in this case located radially inwards from the tongue 10). As the left-hand input part 2 and the right-hand input part 1 are positively spaced apart and their spacing cannot be changed by the axial thrust, there is always enough room left for the output part 3 so that essentially no friction can occur between the output part and the input parts.

Figure 3:
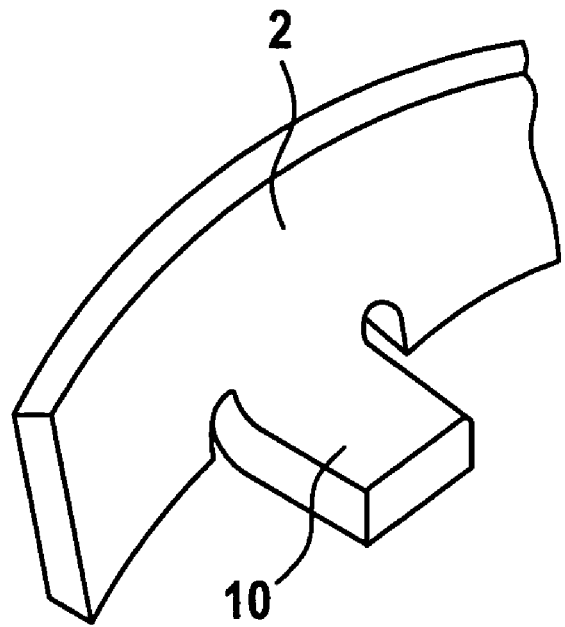
FIG. 3 represents a perspective detail view of a radially inner portion of the left-hand input part of FIG. 2.
Figure 4:
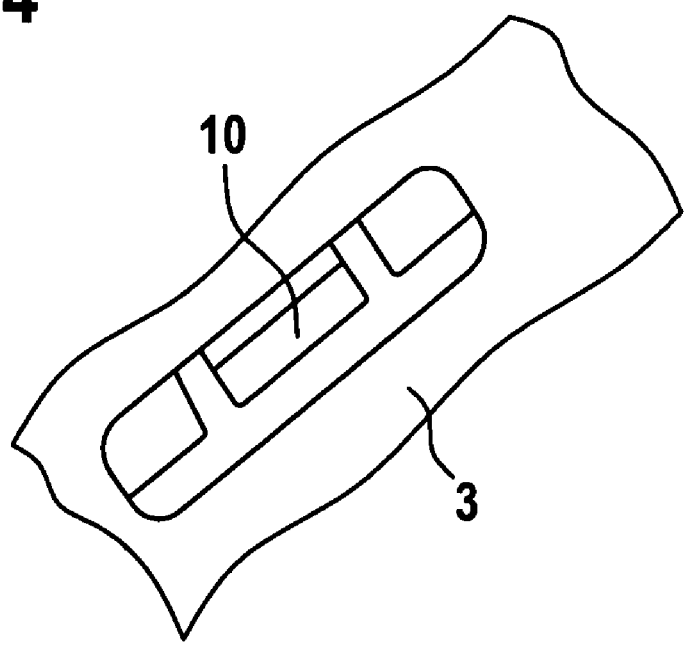
FIG. 4 represents a plan view of the radially inner portion (shown in FIG. 3) of the left-hand input part of FIG. 2.

In order to show the shape of the tongue 10 more clearly, the respective portion of FIG. 2 is presented in an enlarged detail view in FIG. 3. The tongue 10 is formed of the sheet metal of the left-hand input part 2 through an appropriate die-cutting operation with simultaneous or subsequent bending of the tongue 10. With the additional plan view in FIG. 4, the arrangement and design of the tongue 10 become self-explanatory.

Figure 5:
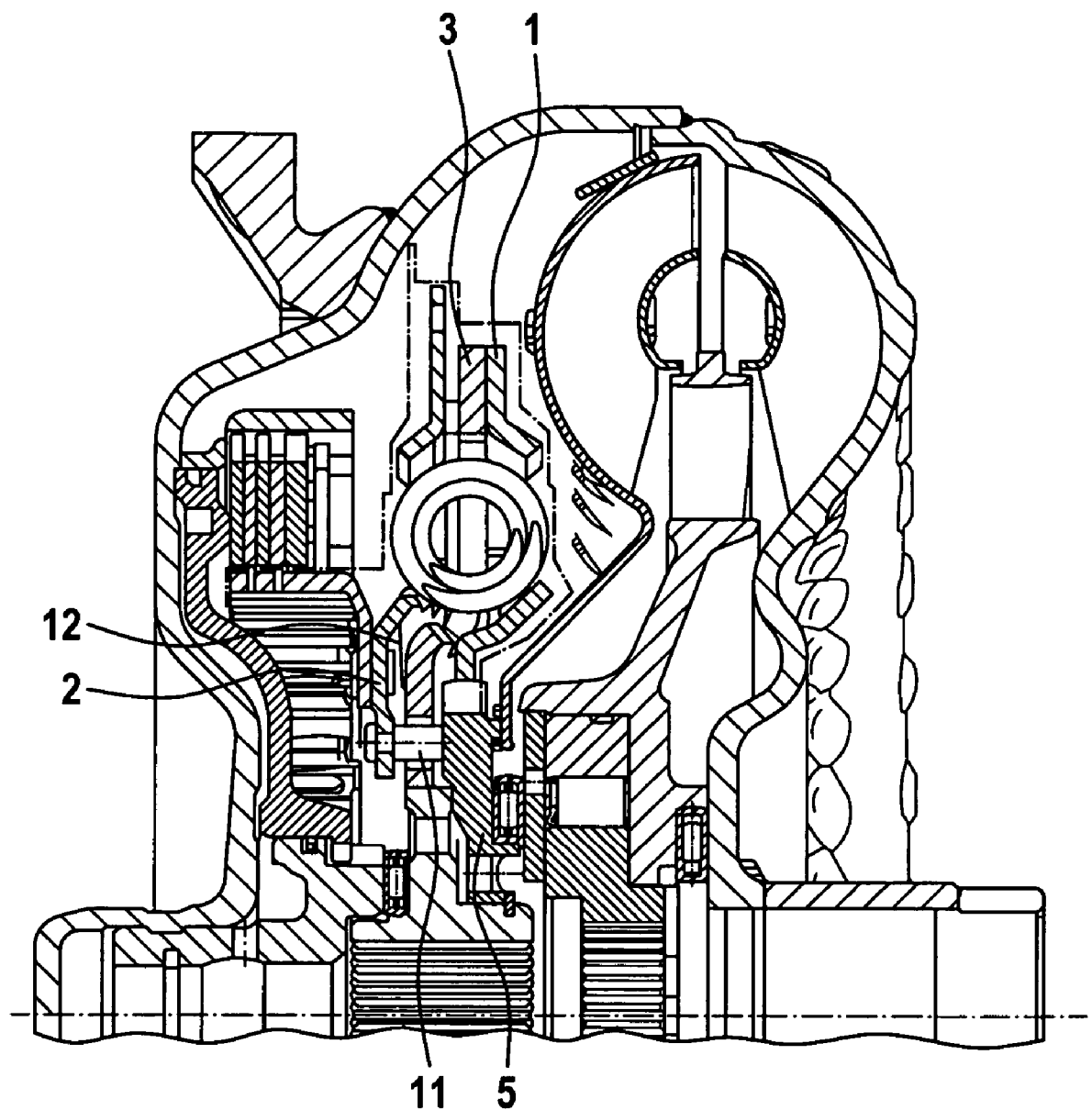
FIG. 5 represents a sectional view of a torque converter, where a separate component is riveted to the inner end of the left-hand input part of the damper.

FIG. 5 represents a variation of the embodiment of FIG. 2. The purpose of FIG. 5 is to demonstrate that the inventive concept for reducing friction can also be realized with a spacer bolt 11. The spacer bolt 11 is riveted to the left-hand input part 2. Like the tongue 10 in FIG. 2, the spacer bolt 11 bears against the turbine hub 5, whereby frictional forces and torques between the input parts 1, 2 and the output part 3 can be noticeably reduced. Also to be mentioned in this context is a diaphragm spring 12, which is arranged between the output part 3 and the left-hand input part 2 in the embodiment of FIG. 5. With an exactly defined tension in the diaphragm spring 12, it is on the one hand possible to realize a finely regulated amount of friction and on the other hand to impede the return flow of oil, so that a stronger oil stream can flow over the friction surfaces of the disk clutch.

Figure 6:
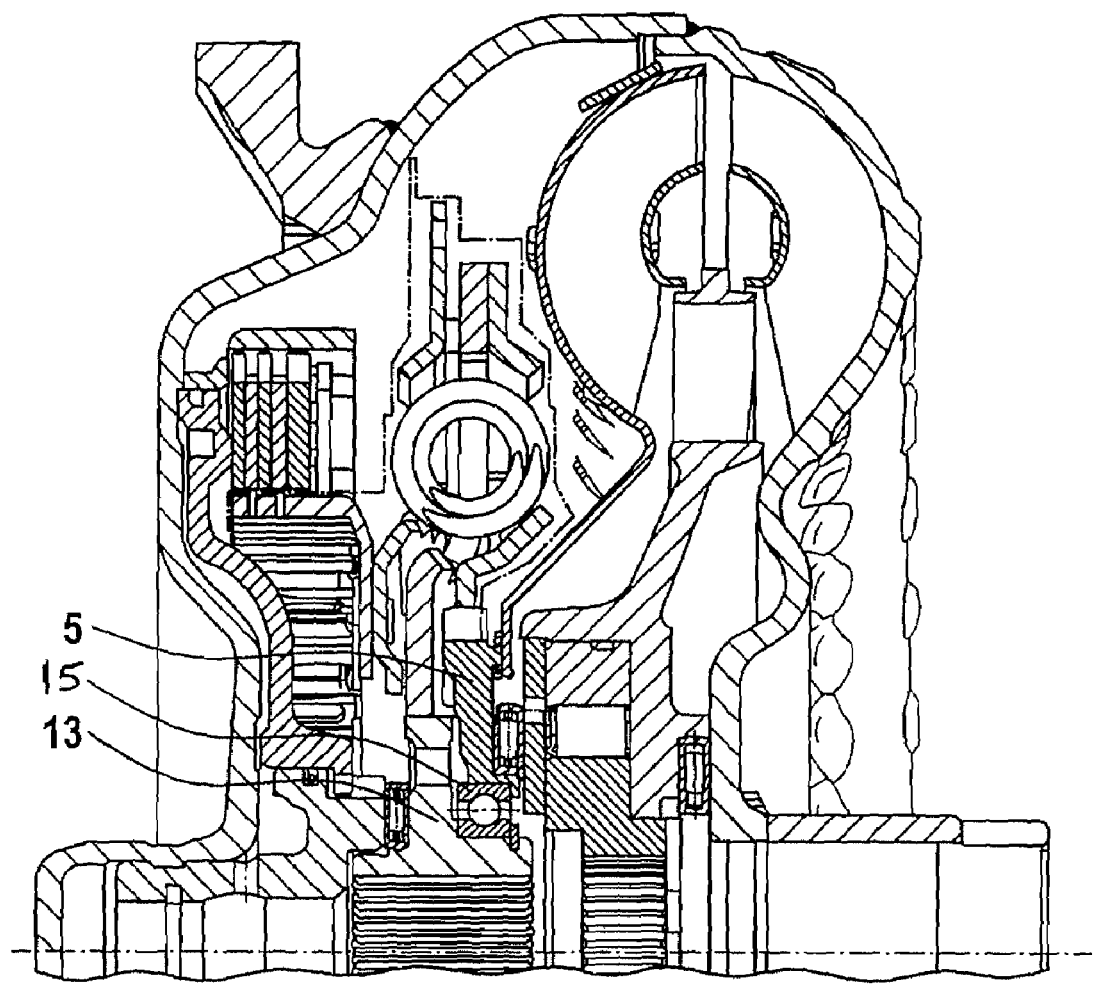
FIG. 6 represents a sectional view of a torque converter, wherein the turbine hub is supported by means of a grooved ball bearing.

In the embodiment of FIG. 6, a bearing 15 is arranged between the damper hub 13 and the turbine hub 5. The bearing 14 is configured as a grooved ball bearing, so that it can on the one hand absorb radial forces and at the same time withstand axial forces which act for example from the right through a stepped rim at the inside circumference of the turbine hub 5.

Figure 7:
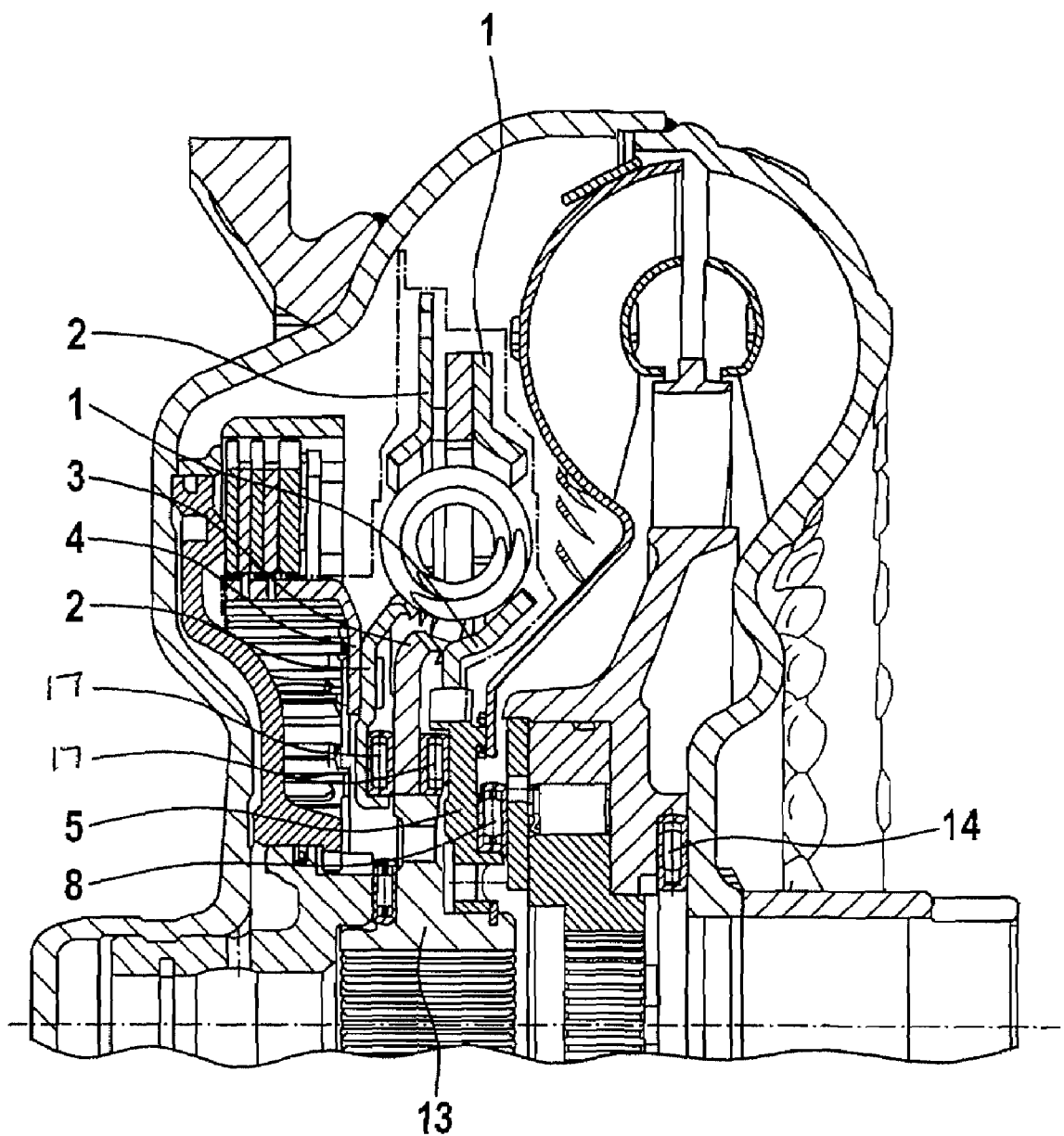
FIG. 7 represents a sectional view of a torque converter having friction reducing measures in the form of gliding bearings.

However, according to the invention, the friction-reducing measures can also include gliding bearings 17 as shown in FIG. 7. The latter have the advantage that they cost in most cases less than roller bearings. Conceivable materials for gliding bearings include bronze, alloys, sinter materials, as well as synthetics such as Teflon.

The scope of the invention further includes combinations of roller bearings, gliding bearings, and spacer elements such as tongues 10 or spacer bolts 11.

LIST OF REFERENCE SYMBOLS 1 right-hand input part
2 left-hand input part
3 output part
4 inner disk carrier
5 turbine hub
6 bearing
7 bearing
8 bearing
9 clearance opening in the flange
10 tongue on the left-hand input part
11 spacer bolt
12 diaphragm spring
13 damper hub (hub of the transmission input shaft)
14 bearing
15 riveted connection

What is claimed is:

1. A torque converter having a housing and a rotary oscillation damper, comprising at least two rotary damper components that are rotatable in relation to each other, and a friction-reducing component interposed between the rotary damper components, wherein the rotary oscillation damper is contained within an interior of the converter housing in contact with oil flowing therein and the at least two rotary components include a first input part of the damper and a turbine hub of the torque converter that rotate synchronously together.

2. The torque converter of claim 1, wherein the damper comprises a turbine damper.

3. The torque converter of claim 1, wherein the damper comprises a torsional damper.

4. The torque converter of claim 1, wherein the friction-reducing element comprises a gliding bearing.

5. The torque converter of claim 4, wherein the gliding bearing comprises a Teflon surface.

6. The torque converter of claim 1, wherein the friction-reducing element comprises a roller bearing.

7. The torque converter of claim 6, wherein the roller bearing comprises an axial needle bearing.

8. The torque converter of claim 6, wherein the roller bearing comprises a grooved ball bearing.

9. The torque converter of claim 1, wherein the at least two rotary damper components comprise the first input part of the damper and the turbine hub of the torque converter, the friction-reducing component being disposed between a second input part of the damper and an output part of the damper and between the output part and the damper.

10. The torque converter of claim 1, wherein the at least two rotary damper components comprise a second input part of the damper that includes a tongue that extends through an opening formed through an output part of the damper and bears against the turbine hub.

11. The torque converter of claim 10, wherein the turbine hub and the second input part rotate synchronously together and the first input part is maintained spaced from the output part and second input part is maintained spaced from the output part.

12. A torque converter with a rotary oscillation damper, comprising at least two rotary damper components that are rotatable in relation to each other, and a friction-reducing component interposed between the rotary damper components, wherein the at least two rotary damper components comprise a first component having first component parts rotating synchronously together, and a second rotary damper component that is arranged between, but not rotating synchronously with, said first component parts, and further comprising a spacer element arranged to hold a distance between said first component parts, so that at least in an area next to the spacer element said first component parts have substantially no contact with the second rotary damper component, wherein the first component parts comprise an input part of the damper and a turbine hub of the torque converter.

* * * * *